United States Patent [19]

Furomoto

[11] Patent Number: 5,211,355
[45] Date of Patent: May 18, 1993

[54] GEAR SUPPORT CONSTRUCTION FOR FISHING REEL

[75] Inventor: Yoshiyuki Furomoto, Osaka, Japan

[73] Assignee: Shimano Industrial Co., Ltd., Japan

[21] Appl. No.: 639,548

[22] Filed: Jan. 10, 1991

[51] Int. Cl.$^5$ .............................................. A01K 89/015
[52] U.S. Cl. ........................................ 242/310; 242/321
[58] Field of Search ............... 242/278, 279, 310, 319, 242/321; 384/126, 127, 128, 192

[56] References Cited

U.S. PATENT DOCUMENTS

| | | | |
|---|---|---|---|
| 1,690,401 | 11/1928 | Case | 242/310 X |
| 2,512,357 | 6/1950 | Maynes | 242/319 X |
| 3,771,746 | 11/1973 | Griste | 242/319 X |
| 4,938,610 | 7/1990 | Kato | 384/127 X |

Primary Examiner—Katherine Matecki
Attorney, Agent, or Firm—Dickstein, Shapiro & Morin

[57] ABSTRACT

A gear support construction for a fishing reel. The construction includes a support shaft projectingly mounted on a reel body member, a gear loosely fitted on a leading end of the support shaft and fitted through a roller bearing on a base end of the support shaft, and a wall portion formed on the reel body member for at least partially covering the support shaft. The wall portion has a rim extending along the support shaft close to a side face of the gear.

5 Claims, 2 Drawing Sheets

GEAR SUPPORT CONSTRUCTION FOR FISHING REEL

BACKGROUND OF THE INVENTION

1. Field of the Invention

The present invention relates to a gear support construction for use in a fishing reel, and more particularly to a support construction for supporting a force transmission gearing used in a fishing reel.

2. Description of the Related Art

According to a typical conventional gear support construction of the above-noted type, a gear is loosely supported on a support shaft through a bush or a roller bearing. In a small size fishing reel roller bearings are often used for elements for transmitting high torque or high revolution.

In such conventional construction using roller bearings in a small reel, the gears too are small and also the support shafts are short in both lengths and diameters. Accordingly, for supporting the gear, if the bearing is simply fitted on the support shaft and then the gear is fitted thereon, there tends to occur the problem that even a small gap between the bearing and the gear can result in positional instability in the rotational axis of this gear, which instability in turn causes axial shaking of the gear during shaft rotation.

In other words, if the gear is relatively large and the support shaft is relatively long in length and diameter, the above-described shaking phenomenon will not easily occur ever with ordinary mechanical precision. On the other hand, in the case of small reels, the gearing too is small. Thus, even a minor defect in precision often leads to the shaft vibration trouble.

Further, the above-described convention suffers also the inconvenience that water splashed onto the reel body often enters the inside of the reel body thus developing rust on the roller bearings.

With view to the above-noted state of the art, the primary object of the present invention is to provide an improved gear support construction for a fishing reel, the improvement effectively preventing the shaft vibration trouble and protecting the smooth rotation of the roller bearings against from the intrusion of water.

SUMMARY OF THE INVENTION

For accomplishing the above-described object, according to the present invention, a gear support construction for a fishing reel, comprises: a support shaft projectingly mounted on a reel body member constituting a reel body; a gear rotatably fitted on a leading end of the support shaft and fitted through a roller bearing on a base end of the support shaft; and a wall portion formed on the reel body member for at least partially covering the support shaft and having a rim extending along the support shaft close to a side face of said gear.

Functions and effects of the above construction will now be described.

If the above construction is embodiment as shown in FIG. 3 for example, the gear 13 is rotatably fitted on a leading end of the support shaft 15 and at the same time fitted through the roller bearing 16 on the base end of the support shaft 15, thus assuring smooth gear rotation. Further, if during rotation the gear 13 tends to be axially displaced relative to the support shaft 15, a free rotation portion 13a of the gear 13 comes into contact with the leading end of the support shaft 15 and also a rim 19a of a wall portion 19 comes into contact with the side face of the gear 13, thus restricting the axial displacement of the gear 13.

Moreover, with the above-described construction, the roller bearing 16 is axially bound between a reel body member 1b and the gear 13 and also the wall portion 19 is positioned at a lateral side normal to the axial direction. Accordingly, the roller bearing 16 is disposed within a substantially enclosed space.

That is to say, according to the conventional construction where the roller bearing 16 is fitted on the support shaft 15 and then the gear 13 is fitted on the bearing 16, this double fitting arrangement tends to cause an axially increased gap of the fitted elements, which increased axial gap results in the axial vibration phenomenon of the gear 13. On the other hand, with the invention's construction where a portion of the gear 13 is rotatably fitted on the support shaft 15, there occurs no increase in the axial gap. Consequently, the invention's construction can avoid the axial displacement of the gear 13 as well as the intrusion of water or the like into the roller bearing.

As described above, the invention has achieved the intended object of providing an improved gear support construction for a fishing reel, the improvement effectively preventing the shaft vibration trouble and protecting smooth rotation of the roller bearings against intrusion of water.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate one preferred embodiment of a gear support construction for a fishing reel according to the invention; in which.

DESCRIPTION OF THE PREFERRED EMBODIMENTS

Figure 1:
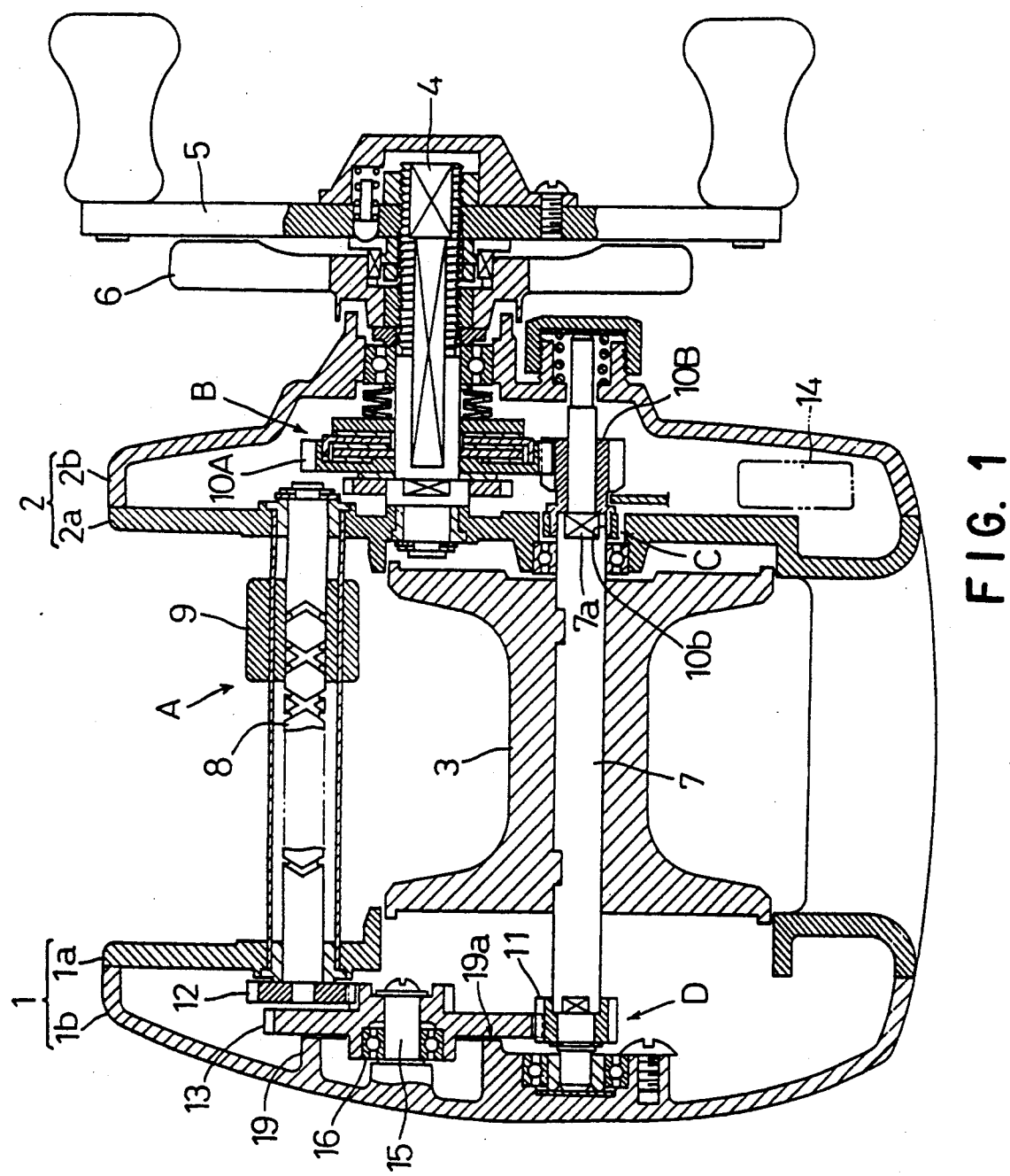
FIG. 1 is a section view of the fishing reel having the gear support construction of the invention.
Figure 2:
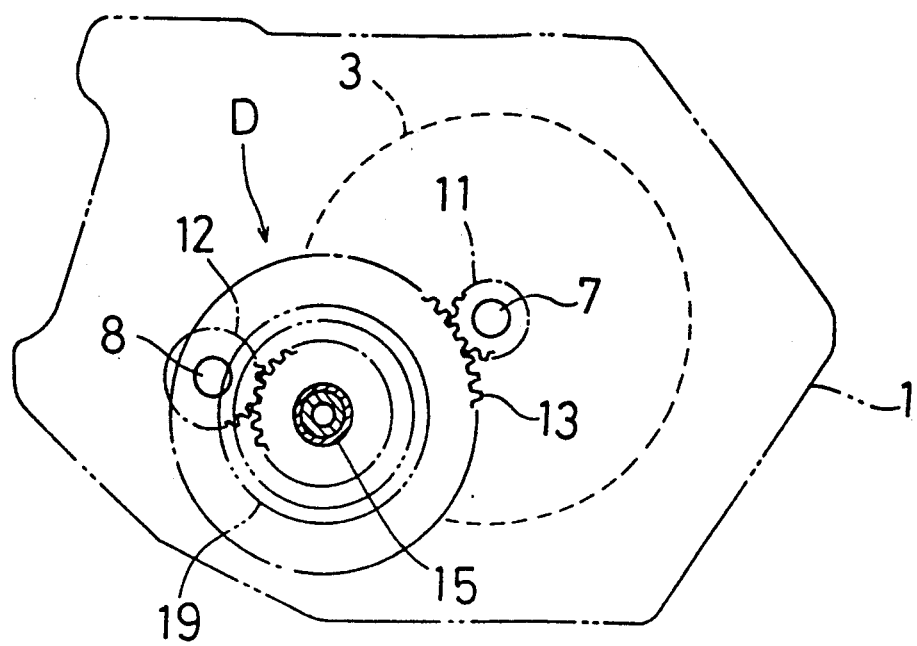
FIG. 2 is a side view of a gearing mechanism.
Figure 3:
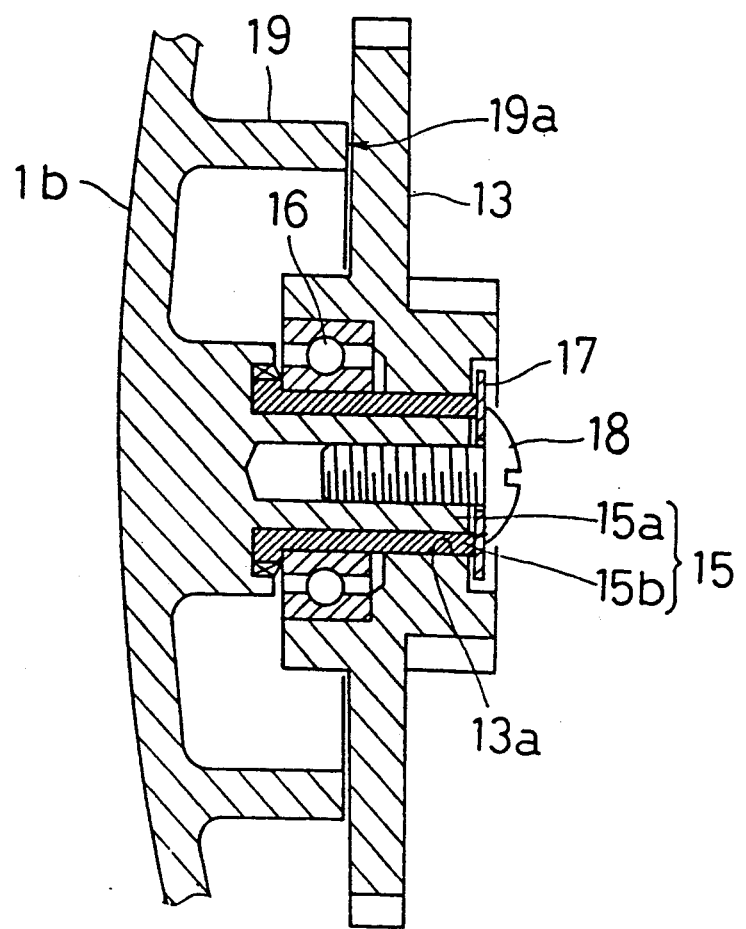
FIG. 3 is a section view of the gear support construction alone.

FIG. 1 is a section view showing a double-bearing type fishing reel including a gear support construction of the invention.

This reel includes a pair of right and left side units 1 and 2 including a pair of side plates 1a, 2a and a pair of resin wall members 1b, 2b covering an outer side of the plates 1a, 2a, respectively. Between the side units 1 and 2, there are disposed a level wind mechanism A, a spool 3 and so on. A control shaft 4, which extends through the right wall member 2b, mounts thereon a line-winding handle 5 and a drag adjustment member 6. Further, the right side unit 2 accommodates therein a transmission mechanism for transmitting power from this control shaft 4 through a drag adjustment mechanism B, a drive gear 10A, an input pinion gear 10B and a clutch mechanism C consequently to a rotary shaft 7 of the spool 3. Whereas, the left side unit 1 accommodates therein a transmission mechanism for transmitting the force from the rotary shaft 7 through a gearing mechanism D to the level wind mechanism A.

This level wind mechanism, as also shown in FIG. 1, includes a spiral shaft 8 defining an endless spiral groove in its outer periphery and a line guide member 9 which effects a reciprocating motion in association with a rotary motion of the spiral shaft 8. The gearing mechanism D includes an output gear 11 fitted on one distal end of the rotary shaft 7, an input gear 12 fitted on one distal end of the spiral shaft 8 and an intermediate gear 13 disposed between the gears 11 and 12. The clutch mechanism C comprises a sleeve 10b of an input pinion gear 10B disengageably engageable with an engaging portion 7a formed on the rotary shaft 7. Then, this clutch mechanism C is operatively connected with an unillustrated control unit such that the mechanism C is actuated for temporary break of power transmission with a push-down operation of a push button 14 disposed on an upper position of the right side unit 2.

For delivering a fishing line from the spool 3, the spool 3 is set for free rotation with the push-down operation of the bush button 14. Then, during this free rotation, the spool 3 is rotated at a significantly high speed. For enabling the level wind mechanism to function smoothly during the above high speed spool rotation, the intermediate gear 13 is supported via a roller bearing 16 on a support shaft 15 projectingly attached to an inner face of the left wall member 1b.

More particularly, this support shaft 15 includes a shaft portion 15a formed integrally with the wall member 1b and a sleeve 15b fitted on the shaft portion 15a. Then, the intermediate gear 13 is fitted on a leading end of the sleeve 15b and at the same time the gear 13 is supported via the roller bearing 16 at a base end of the sleeve 15b. Further, at the leading end of the support shaft 15, a bolt 18 acting as an anti-disengagement element is fitted via a washer 17 for preventing inadvertent disengagement of this support shaft 15.

Adjacent the inner face of the wall member 1b, a wall portion 19 is formed continuously with the wall member 1b, and the portion 19 has a rim 19a extending to a lateral side face of the intermediate gear 13. Accordingly, when this intermediate gear 13 is rotated for power transmission, the contact between a free rotation portion 13a of the gear 13 and the support shaft 15 and the further contact between the wall portion 19 and the gear 13 together prevent axial displacement and the resultant vibration of this intermediate gear 13 during its rotation.

Some other embodiments of the invention will now be described in particular.

The gear support construction of the present invention may be embodied without the sleeve of the support shaft.

The invention's construction may be embodied as any other construction than that for the level wind mechanism.

It is conceivable to form the wall portion in any other shape than the cylindrical shape.

It is also conceivable to form a slit in the wall portion. The ridge rim of the wall portion may be formed as a sharp point. In these ways, the shape of this wall portion may be modified in any other way depending on the convenience.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraced therein.

What is claimed is:

1. A gear support construction for a fishing reel, said construction comprising:

a support shaft projectingly mounted on a reel body member forming part of a reel body;

a gear defining a bore having a first inner diameter portion at which said gear is rotatably fitted on a distal end portion of said support shaft and a second inner diameter portion at which said gear is fitted on a roller bearing which is in turn fitted on a base end portion of said support shaft; and a wall portion formed on said reel body member at least partially surrounding said support shaft, said wall portion having a rim at a distal end thereof, said rim having an outer diameter which is smaller than a diameter of a circle defined by the bases of the teeth of said gear, said wall portion projecting along a longitudinal axis of said support shaft such that said rim is positioned close to and faces a face of said gear adjacent said reel body member.

2. A gear support construction as defined in claim 1, wherein said support shaft includes a shaft portion formed integrally with said reel body member and a sleeve fitted on said shaft portion.

3. A gear support construction as defined in claim 2 further comprising a washer, a fixing member securing said washer to a leading end portion of said support shaft, said washer having a outer diameter larger than said first inner diameter portion of said gear, wherein said washer prevents said gear from disengaging from said support shaft.

4. A gear support construction as defined in claim 1, wherein said wall portion is formed integrally with an inner face of said reel body member and coaxially with said support shaft.

5. A gear support construction as defined in claim 1 wherein said reel body member, wall portion, rim, support shaft and gear substantially enclose said roller bearing.

* * * * *